United States Patent [19]

Schmoede et al.

[11] Patent Number: 4,643,235

[45] Date of Patent: Feb. 17, 1987

[54] METHOD FOR MAKING OXYGEN ELECTRODE FOR ALKALINE GALVANIC CELLS

[75] Inventors: Peter Schmoede, Brilon, Fed. Rep. of Germany; Detlef Katryniok, deceased, late of Brilon, Fed. Rep. of Germany, by Christine Katryniok, legal representative; Jean P. Ruch, Brilon, Fed. Rep. of Germany

[73] Assignee: Accumulatorenwerke Hoppecke Carl Zoellner & Sohn GmbH & Co. KG, Brilon, Fed. Rep. of Germany

[21] Appl. No.: 802,861

[22] Filed: Nov. 27, 1985

Related U.S. Application Data

[62] Division of Ser. No. 646,418, Aug. 31, 1984.

[30] Foreign Application Priority Data

Sep. 2, 1983 [DE]  Fed. Rep. of Germany ....... 3331699

[51] Int. Cl.$^4$ ............................ H01M 4/21; B65B 3/04
[52] U.S. Cl. .................................... 141/1.1; 429/27; 429/42
[58] Field of Search ................... 429/27, 42; 141/101, 141/32, 33

[56] References Cited

U.S. PATENT DOCUMENTS 3,600,230  8/1971  Stachurski et al. ................ 429/42
4,341,848  7/1982  Liu et al. ........................... 429/27

Primary Examiner—Houston S. Bell, Jr.
Attorney, Agent, or Firm—Becker & Becker, Inc.

[57] ABSTRACT

An oxygen electrode for alkaline galvanic cells. The electrode includes a catalyst-containing carbon layer, a current collector, and a preferably foil-like separator for separating a liquid chamber from a gas chamber in such a way that the gas can pass to the carbon layer but the liquid cannot enter the gas chamber. The electrode has a structurally simple construction as a multi-layer, gas diffusion electrode, the current density of which, in the temperature range of between approximately 20° and 80° C., is approximately 350 mA/cm$^2$ during operation with air, and greater than 1 A/cm$^2$ during operation with oxygen. The current collector includes a metal grid which is at least partially embedded in a carbon layer. In the method of producing such an oxygen electrode, a catalyst salt solution is mixed with an aqueous activated carbon suspension and is deposited onto the activated carbon to form a catalyst dispersion. Subsequently, the liquid is separated off to form a catalyst composition, and the metal grid is embedded at least partially in this catalyst composition.

5 Claims, 3 Drawing Figures

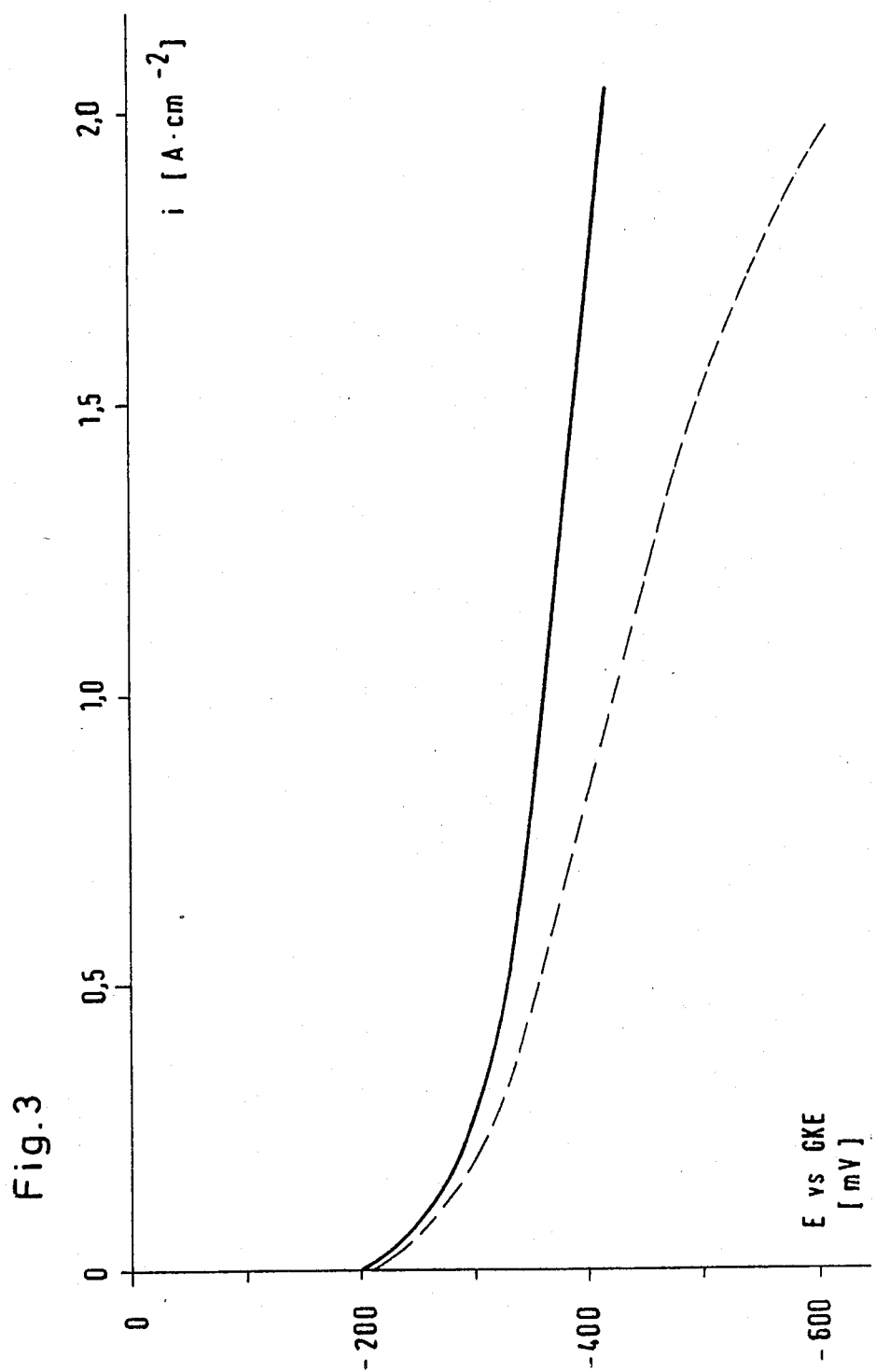

4,643,235

METHOD FOR MAKING OXYGEN ELECTRODE FOR ALKALINE GALVANIC CELLS

This is a divisional application of co-pending parent application of U.S. Ser. No. 646,418—Schmöde et al filed Aug. 31, 1984.

BACKGROUND OF THE INVENTION

1. Field of the Invention

The present invention relates to oxygen electrodes for alkaline galvanic cells or batteries. The electrodes comprise a catalyst-containing carbon layer, a current collector, and separating means, especially in the form of a foil, for separating a liquid chamber from a gas chamber in such a way that the gas can pass via the carbon layer to the liquid, but the liquid cannot enter the gas chamber. The present invention also relates to a method of producing such oxygen electrodes.

2. Description of Prior Art

A multi-layer, gas diffusion electrode of this general type is known from German Patent No. 19 04 608. The objective of this patent is to improve the sealing capactiy of an electrode having very high porosity without significantly increasing the resistance to diffusion; the patent proposes the placement of a water-repellent layer of powdery carbon, powdery nickel oxide, or powdery aluminum oxide and a bonding material onto the gas side. A layer of powdery fluorohydrocarbon resin is disposed on this layer, and a further water-repellent layer is disposed on the resin layer. The resin layer and the water-repellent layer are used to assure that the electrodes are sealed or watertight.

Drawbacks to this heretofore known multi-layer, gas diffusion electrode are the complicated manufacture and the power characteristic, especially with respect to the current density which can be achieved. The basis or reason for this disadvantageous characteristic is that the sintered and porous metallic member which serves as the current collector has a very complicated construction with an internally located screen of nickel. Pursuant to the disclosed embodiment, the sintered member comprises 8 g activated carbon, to which 92 g nickel carbonyl is added; the mixture is sintered. The screen of nickel is centrally disposed in the sintered member. The sintered member is provided with a quantity of a catalyst mixture of platinum and palladium, and is finally impregnated with an emulsion of polytetrafluoroethylene (PTFE) in order to make the sintered member watertight. Already this abbreviated description should make clear the complicated manufacture which has to be carried out. Beyond that, there also has been observed that for the operation of such an electrode, high power cannot be achieved with a sintered metallic layer. Thus, at satisfactory electrical outputs, the current density is 100 mA/cm$^2$.

An object of the present invention, on the other hand, with an overall simple construction of the oxygen electrode as a multi-layer, gas diffusion electrode is to achieve a power characteristic which makes possible the achievement of the following values: during air operation, independent of the temperature, 350 mA/cm$^2$, and during oxygen operation, independent of the temperature, greater than 1 A/cm$^2$ ("independent of the temperature" in this case denotes a temperature range from approximately 20° to 80° C.). There is particularly desired that the potential of the oxygen electrode be essentially maintained even under load for a long period of time.

BRIEF DESCRIPTION OF THE DRAWINGS

These objects, and other objects and advantages of the present invention, will appear more clearly from the following specification in conjunction with the accompanying drawings, in which:

FIG. 3 graphically shows two curves which illustrate the potential-current density characteristics of an inventive oxygen electrode.

SUMMARY OF THE INVENTION

Figure 1:
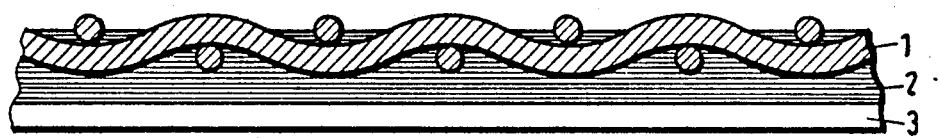
FIG. 1 schematically illustrates one embodiment for the construction of the inventive oxygen electrode.

The oxygen electrode of the present invention is characterized primarily in that the current collector comprises a metal grid which is embedded at least partially in the carbon layer.

Thus, in place of the heretofore known current collector which is made of a sintered material to which is bonded a catalyst-containing carbon layer, the present invention is based on the fundamental concept of using a metal grid as the current collector which is embedded at least partially in the catalyst-containing carbon layer. In so doing, the activated catalyst surface is covered only minimally, yet nevertheless the electrical current can be drawn off from the catalyst layer along the shortest path.

Pursuant to one practical specific embodiment of the present invention, the wire diameter of the grid is between 0.08 and 0.16 mm, preferably 0.12 mm, and the mesh count per cm$^2$ is 150 to 290, preferably approximately 219. Such a metal grid preferably comprises silver or nickel, and the surface thereof is mechanically or chemically roughened.

A particularly favorable potential of the oxygen electrode is achieved when the carbon layer comprises an activated carbon powder having a high BET surface and a supplement of fine silver particles of 20 to 40% by weight, preferably 30% by weight, relative to the catalyst-containing carbon layer. Other metals as a catalyst supplement, such as activated nickel powder, manganese, mercury, or lead, have proven to be less effective, i.e. no improvement of the potential state under current load could be achieved relative to the pure activated carbon with their use.

However, the potential state can be favorably influenced by additionally adding, to the silver-containing activated carbon, a palladium-silver alloy or mixture of three parts palladium and one part silver, so that the carbon layer comprises 30 to 40% by weight carbon, 15 to 30% by weight silver, 10 to 20% by weight palladium, and 20 to 30% by weight of a binder. Up to now, the best results were achieved with a composition of approximately 36% by weight carbon, 21% by weight silver, 17% by weight palladium, and 26% by weight binder.

The inventive carbon layer preferably should have a thickness of 0.2 to 0.5 mm, preferably 0.3 mm. In this way, the average catalyst coating of these electrodes is 10 to 11 mg/cm$^2$. The binder is generally PTFE (polytetrafluoroethylene), which preferably also is used as the separating means, and in particular in the form of a foil which has a thickness of 0.08 to 2 mm, preferably 0.14 mm. The porosity of the foil is preferably between 60 and 80%, especially approximately 70%, with the size of the pores inventively being between 1 and 100 μm with the pore sizes for operation with oxygen preferably being 5 to 10 μm and for operation with air 1 to 5 μm.

The method of producing an inventive oxygen electrode is characterized primarily by mixing a catalyst salt solution with an aqueous activated carbon suspension, whereby the catalyst is deposited on the activated carbon to form a catalyst dispersion, subsequently separating off the liquid to form a catalyst composition and at least partially embedding the metal grid in the catalyst composition. In this way, a particularly effective fine distribution of the catalyst metal, especially of the silver and the palladium, is effected The metal grid can be roughened prior to being embedded in the catalyst composition.

If the mixing takes place in an ultrasonic bath, a particularly favorable particle size distribution is obtained such that a shift to more smaller granules occurs, which increases the effective catalyst surface.

When the separating-off is effected by introducing the catalyst dispersion into a water-filled sedimentation tank and sedimenting the dispersion on a paper fleece, a particularly favorable build-up of the layer occurs with regard to the distribution of the particle sizes; with this build-up, the subsequently deposited layers have smaller granular sizes.

Especially with a catalyst layer produced pursuant to the sedimentation process, there is advisable to only press the metal grid into the surface of this catalyst layer until a sufficient adhesion between the two is achieved. Then approximately 5 to 30% of the grid surface still is not surrounded by the catalyst, but rather is exposed to direct contact with the electrolyte of the galvanic cell.

The separating off also can be conducted by pasting the catalyst composition onto the fleece, rolling the same under a pressing effect, subsequently pressing the grid into or onto the catalyst composition, then withdrawing the fleece, and finally drying the electrode at a temperature of between 150° C. and 200° C.

DESCRIPTION OF PREFERRED EMBODIMENTS

Referring now to the drawings in detail, a typical construction of one embodiment of the inventive oxygen electrode is shown in FIG. 1. Illustrated is an electrochemically pretreated silver grid 1, which serves as the current collector, a dried, porous catalyst composition 2, and a hydrophobic or moisture-repellent barrier layer in the form of a PTFE membrane foil.

Figure 2:
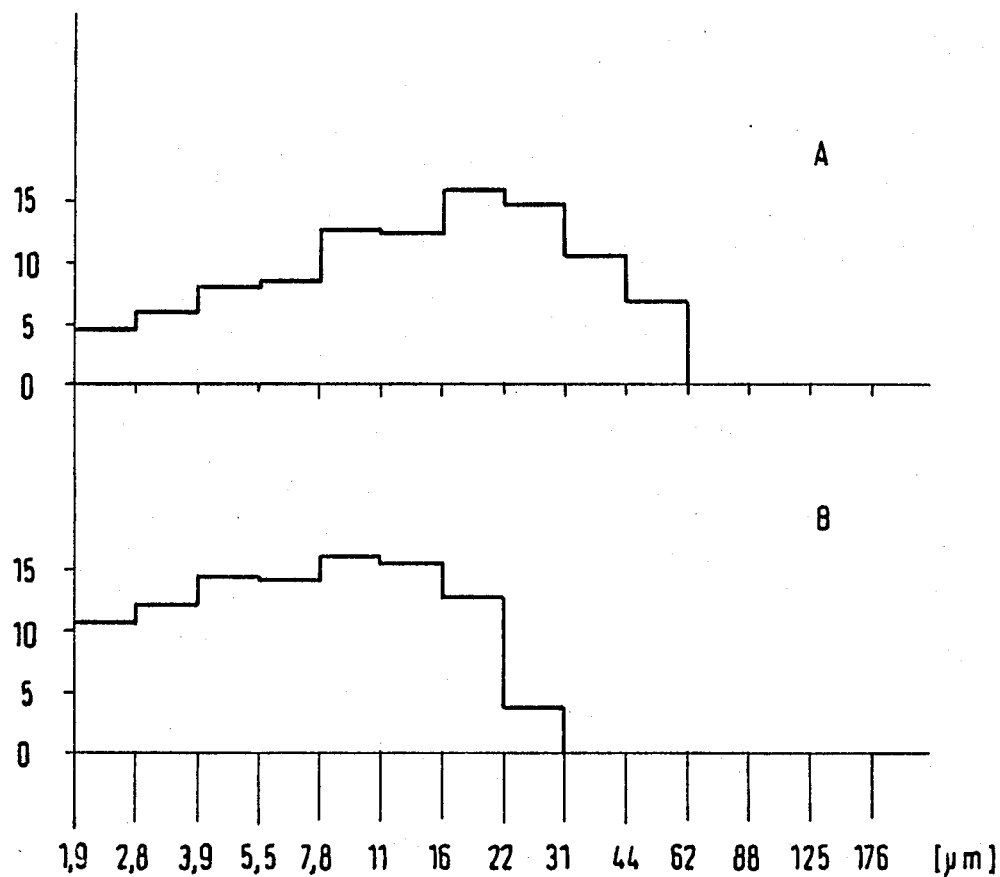
FIG. 2 graphically illustrates the particle size distribution of the catalyst composition both without the use of ultrasonics (A), and with the use of ultrasonics (B)

FIG. 2 shows the particle size distribution of the catalyst composition without the application of ultrasound during the mixing (A), and with ultrasound processing for ten minutes (B). The potential-current density characteristic of an inventive oxygen electrode is plotted in FIG. 3, with the potential being galvanostatically measured in a 6.5 molar KOH solution at 60° C. versus a saturated calomel or mercurous chloride electrode (GKE); the solid line represents the potential curve for pure oxygen, and the dashed line represents the potential curve for atmospheric air.

EXAMPLE

Added to an aqueous activated carbon suspension, which preferably comprises 20 ml water and 1 ml alcohol per g activated carbon, is an amount of silver nitrate which corresponds to 30% by weight silver on a base catalyst of activated carbon and silver; the silver nitrate is preferably dissolved in an equal volume of water. While being stirred, the solution is cooled to 0° C., thus improving the deposition of the silver on the activated carbon, since the heat produced during the reaction is immediately dissipated. Accompanied by stirring, the equivalent quantity of potassium borohydride for the reduction of the silver nitrate is added dropwise as a 5% solution which has been precooled to 0° C. After this addition has been completed, reaction mixture is stirred for at least 15 more minutes, is subsequently filtered, and is washed with hot distilled water. The resulting base catalyst composition exists as a solid or as pasty powder cakes, and subsequently is dried for one hour at 200° C.; thereafter, particles greater than 100 μm are separated by screening from the catalyst composition, which is mixed thoroughly by stirring. Depending upon the electrode composition which is provided, the calculated parts by weight of base catalyst and catalyst supplement are subsequently combined. The long-term stability of the electrode potential is improved by this catalyst supplement, which comprises approximately three parts palladium and one part silver. With a mixture ratio of 70% of the base catalyst, which comprises up to 30% silver, with 30% by weight of the catalyst supplement of three parts palladium and one part silver, there results a composition of the finished catalyst composition of 49% by weight activated carbon, 28.5% by weight silver, and 22.5% by weight palladium. Added per gram of this catalyst composition are, for example, 5 ml solvent (water or water with up to 10% by volume methanol and ethanol). To reduce the mean particle size distribution, and to increase the activity of the catalyst as a result of shorter diffusion paths, this mixture is stirred in an ultrasonic bath to form a uniform, pasty dispersion. Added to this dispersion are 0.6 ml PTFE suspension per g catalyst composition as binder, and this mixture is stirred into a paste.

A crude electrode can be produced by depositing the catalyst dispersion onto a paper fleece having the size and shape of the electrode; the dispersion can be rolled in order to distribute the dispersion uniformly over the paper fleece. However, there is preferred to dilute the pasty catalyst dispersion with water in the ratio of 1:10, to mix the dispersion with a standard dispersing agent, and to stir the same into a uniform dispersion. Mounted on a screen support in a sedimentation tank are paper fleeces over which is disposed a water column of 20 to 50 cm, preferably 30 cm. The catalyst dispersion is introduced into the sedimentation tank into a pan above the water level. After the pan is mechanically opened, the dispersion can flow uniformly onto the surface of the water. The water level in the sedimentation tank is then lowered, preferably at the rate of 1 cm height of water per minute, via a water outlet below the paper fleece. After completion of the sedimentation, the paper fleece is removed along with the catalyst from the screen support and a current collector grid of silver having a wire gauge or thickness of 0.12 mm and a mesh count per $cm^2$ of 219 subsequently is rolled on or is forced on at 2 $kN/cm^2$ for 30 sec. Thereafter, the paper fleece is removed and the electrode is dried for one hour at 100° to 200° C. Finally, a PTFE membrane foil having a thickness of 0.14 mm is pressed at 1 $kN/cm^2$ for 15 sec. onto that side which is remote from the metal grid. This foil is a stretched product or one which has been bombarded with gamma rays, and the sizes of the pores thereof are between 1 and 5 μm for operation with air, and between 5 and 10 μm for operation with oxygen.

The PTFE binder for the catalyst composition can be an aqueous PTFE solution with 5% (relative to the PTFE) of non-ionic dispersant. The dispersing agent, which is added at approximately 1% by weight to the diluted catalyst dispersion, can be a sodium salt of a polyacrylamide.

With such an electrode, the particle size distribution of which is plotted in FIG. 2B, the current density-voltage characteristic curves illustrated in FIG. 3 were ascertained in a half cell arrangement, where the electrolyte, the temperature of which has been preset, is pumped through, and where the measurement is galvanostatically effected. A nickel plate is used as the counter electrode, and saturated mercurous chloride electrodes were used as reference electrodes.

Further tests have shown that when a plastic binding material is used on the catalyst composition, a special moisture-repellent layer can be eliminated.

By electrochemically pretreating the collector grid by etching the same, a roughening is achieved which increases the contact surface, and improved adhesion of the catalyst composition also is achieved.

The inventive oxygen electrodes can be provided with separating contact points which are stuck thereon or are applied by means of hold templates with the advantage that at the optimum selection of the position and size of the points, only few surfaces are covered, the inner resistance is low, and no active parts are covered. In this way, very small distances relative to the counter electrodes are achieved, and an improved electrolyte flow is achieved also. Even when only a few separating contact points are used, a sufficient short-circuit strength is achieved. The arrangement of the separating contact points on the collector grid produces capability to affect the flow-through of the electrolyte.

The present invention is, of course, in no way restricted to the specific disclosure of the specification and drawings, but also encompasses any modifications within the scope of the appended claims.

What is claimed is:

1. A method of producing a single-layer oxygen electrode for alkaline galvanic cells and including a carbon layer having 30 to 40% by weight carbon, 15 to 30% by weight silver, 10 to 20% by weight palladium and 20 to 30% by weight binder, comprising the steps of:

mixing a catalyst salt solution with a liquid to form an aqueous activated carbon suspension, for distribution thereof so that there is depositing of catalyst on said activated carbon to form a catalyst dispersion;

separating off the liquid to form a catalyst composition; and at least partially embedding a metal grid in said catalyst composition to produce the single-layer oxygen electrode.

2. A method according to claim 1, which includes the step of roughening said metal grid prior to said embedding step.

3. A method according to claim 1, which includes the step of conducting said mixing step in an ultrasonic bath.

4. A method according to claim 1, in which said separating off step includes introducing said catalyst dispersion in a water-filled sedimentation tank, and sedimenting it on a paper fleece.

5. A method according to claim 4, which includes the steps of pasting said catalyst composition onto said fleece, rolling said composition under a pressing effect, pressing said grid onto or into said catalyst composition, removing said fleece, and drying said electrode at a temperature of between 150° and 200° C.

* * * * *